(12) United States Patent
Luo et al.

(10) Patent No.: US 11,714,508 B2
(45) Date of Patent: Aug. 1, 2023

(54) ACCIDENTAL TOUCH PREVENTION METHOD AND APPARATUS, AND STORAGE MEDIUM

(71) Applicant: GREE ELECTRIC APPLIANCES, INC. OF ZHUHAI, Zhuhai (CN)

(72) Inventors: Baixiang Luo, Zhuhai (CN); Haoyu Tian, Zhuhai (CN)

(73) Assignee: GREE ELECTRIC APPLIANCES, INC. OF ZHUHAI, Qianshan Zhuhai (CN)

( * ) Notice: Subject to any disclaimer, the term of this patent is extended or adjusted under 35 U.S.C. 154(b) by 0 days.

(21) Appl. No.: 17/625,237

(22) PCT Filed: Jun. 29, 2020

(86) PCT No.: PCT/CN2020/098670
§ 371 (c)(1),
(2) Date: Jan. 6, 2022

(87) PCT Pub. No.: WO2021/012885
PCT Pub. Date: Jan. 28, 2021

(65) Prior Publication Data
US 2022/0253193 A1   Aug. 11, 2022

(30) Foreign Application Priority Data

Jul. 19, 2019 (CN) .......................... 201910655960.4

(51) Int. Cl.
*G06F 3/041* (2006.01)
*G06F 3/14* (2006.01)

(52) U.S. Cl.
CPC ........ *G06F 3/04186* (2019.05); *G06F 3/1423* (2013.01)

(58) Field of Classification Search
CPC .. G06F 3/04186; G06F 3/1423; G06F 3/0416; G06F 3/147; G06F 11/3041; G09G 2354/00
See application file for complete search history.

(56) References Cited

U.S. PATENT DOCUMENTS

| 10,416,876 B2 * | 9/2019 | Lippolis ............... G06F 3/04883 |
| 2015/0317006 A1 * | 11/2015 | Cho ....................... G06F 1/1652 345/173 |

(Continued)

FOREIGN PATENT DOCUMENTS

| CN | 104834473 A | 8/2015 |
| CN | 106569707 A | 4/2017 |

(Continued)

OTHER PUBLICATIONS

International Search Report dated Oct. 12, 2020, issued in corresponding International Application No. PCT/CN2020/098670, filed Jun. 29, 2020, 2 pages.

*Primary Examiner* — Dmitriy Bolotin
(74) *Attorney, Agent, or Firm* — Christensen O'Connor Johnson Kindness PLLC (57) ABSTRACT

An accidental touch prevention method and apparatus, and a storage medium, relating to the field of intelligent terminals, and used for solving the problem in the prior art of input focus movement or loss caused by an accidental touch on a screen. The method is applied to an intelligent terminal having a folding screen. In the method, when one screen of the intelligent terminal is in an editing state, event monitoring is carried out on other screens, and if it is detected that a click event occurs on the other screens, the event is intercepted, so that when a user edits content in one screen, if the user accidentally touches the other screens, the input (Continued)

focus is not changed, normal editing f the user is guaranteed, and user experience is improved.

11 Claims, 5 Drawing Sheets

(56) References Cited

U.S. PATENT DOCUMENTS

| | | | |
|---|---|---|---|
| 2016/0372083 A1* | 12/2016 | Taite | G06F 3/04886 |
| 2018/0129262 A1* | 5/2018 | Veiga | G06F 3/0488 |
| 2019/0034147 A1* | 1/2019 | Koki | G06F 1/1616 |
| 2020/0133426 A1* | 4/2020 | Yildiz | G06F 1/1669 |
| 2020/0264657 A1* | 8/2020 | Lee | G06F 3/0487 |
| 2020/0356254 A1* | 11/2020 | Missig | G06F 3/0485 |

FOREIGN PATENT DOCUMENTS

| | | |
|---|---|---|
| CN | 106681635 A | 5/2017 |
| CN | 107422901 A | 12/2017 |
| CN | 108153458 A | 6/2018 |
| CN | 108737640 A | 11/2018 |
| CN | 109639890 A | 4/2019 |
| CN | 109739427 A | 5/2019 |
| CN | 110413153 A | 11/2019 |

\* cited by examiner

ACCIDENTAL TOUCH PREVENTION METHOD AND APPARATUS, AND STORAGE MEDIUM

CROSS REFERENCES TO RELATED APPLICATION

This application is a National Stage of International Application No. PCT/CN2020/098670, filed Jun. 29, 2020, which claims priority to Chinese patent application No. 201910655960.4, titled "Accidental Touch Prevention Method and Apparatus, and Storage Medium", and filed on Jul. 19, 2019, the contents of which are hereby incorporated by reference in their entirety.

TECHNICAL FIELD

The present disclosure relates to the field of intelligent terminals, and particularly to an accidental touch prevention method and apparatus, and a storage medium.

BACKGROUND

When a foldable mobile phone is working on both the front and back screens, and the document editing, or the instant messaging, etc., is performed on the front screen, a finger may accidentally click on the back screen, which causes the input focus of the front screen to move to other positions, or the input focus is directly lost.

SUMMARY

In the embodiments of the present disclosure, an accidental touch prevention method and apparatus, and a storage medium are provided to solve the problem in the related art that the input focus is moved or lost due to the accidental touch on the screen.

In the first aspect, an accidental touch prevention method is provided in the embodiment of the present disclosure, and the method includes:

when at least two screens are in a working state and detecting that an input method pop-up box is activated on any one of the screens in the working state, performing event monitoring on another screen other than the screen on which the input method pop-up box is activated;

when a click event is detected on the other screen, intercepting the click event and remaining an input focus unchanged.

In the second aspect, an accidental touch prevention apparatus is provided in the embodiment of the present disclosure, and the apparatus includes:

a monitoring module, configured to, when at least two screens are in a working state and detecting that an input method pop-up box is activated on any one of the screens in the working state, perform event monitoring on another screen other than the screen on which the input method pop-up box is activated;

a first interception module, configured to intercept a click event and remain an input focus unchanged when the click event is detected on the other screen.

In the third aspect, a computing device is provided in the embodiment of the present disclosure, including at least one processor, and a memory communicated with the at least one processor; the memory stores instructions executable by the at least one processor, and the instructions are executed by the at least one processor to enable the at least one processor to perform the method according to the embodiment of the present disclosure.

In the fourth aspect, a storage medium for a terminal device is provided in the embodiment of the present disclosure, the storage medium for the terminal device stores executable instructions for the terminal device, the executable instructions for the terminal device are configured to make the terminal device perform the method according to the embodiment of the present disclosure.

The accidental touch prevention method and apparatus, and storage medium provided by the embodiments of the present disclosure are applied to the intelligent terminal with the foldable screen. When one of the screens of the intelligent terminal is in the editing state, event monitoring is performed on another screen. When a click event is detected on the other screen, the event is intercepted. In such a manner, when the user edits the content on one of the screens, if the user accidentally touches the other screen, the input focus is not changed, thereby ensuring the normal editing of the user and improving the user experience.

Other features and advantages of the present disclosure will be described below, and part of which become obvious from the specification, or understood by implementing the present disclosure. The purpose and other advantages of the present disclosure can be implemented and obtained through the structures specified in the specification, claims, and drawings.

BRIEF DESCRIPTION OF THE DRAWINGS

The accompanying drawings described herein are utilized to provide a further understanding of the present disclosure and constitute a part of the present disclosure. The exemplary embodiments of the present disclosure and descriptions thereof are utilized to explain the present disclosure, and do not constitute an improper limitation on the present disclosure.

In the drawings.

DETAILED DESCRIPTION

In order to solve the problem in the related art that the input focus is moved or lost due to the accidental touch on the screen, embodiments of the present disclosure provide an accidental touch prevention method and apparatus, and a storage medium. In order to better understand the technical solution provided by the embodiments of the present disclosure, a brief description of the basic principle of the solution is provided here.

In some embodiments, a screen of a foldable mobile phone is folded inward or outward, and the screen of the mobile phone is switched between a smaller size and a large size. It should be noted that the motherboard and battery cannot be folded, but actually only the screen can be folded, and the motherboard and battery are arranged in the fuselage on both sides. At present, when the both screens of the foldable mobile phone are working simultaneously, and the user edits a word document, communicates and chats on one of the screens, if the user accidentally touches the other screen, the input focus may be caused to move to other positions or the input focus may be directly lost, or even additional editing is performed on the normal content, which causes great confusion and inconvenience to the user.

In view of this, the embodiments of the present disclosure provide an accidental touch prevention method. When one of the screens of the intelligent terminal is in an editing state, event monitoring is performed on another screen. If a click event is detected on the other screen, the event is intercepted. In such a manner, when the user edits the content on one of the screens, if the user accidentally touches the other screen, the input focus does not change, thereby ensuring the normal editing of the user and improving the user experience.

Figure 1:
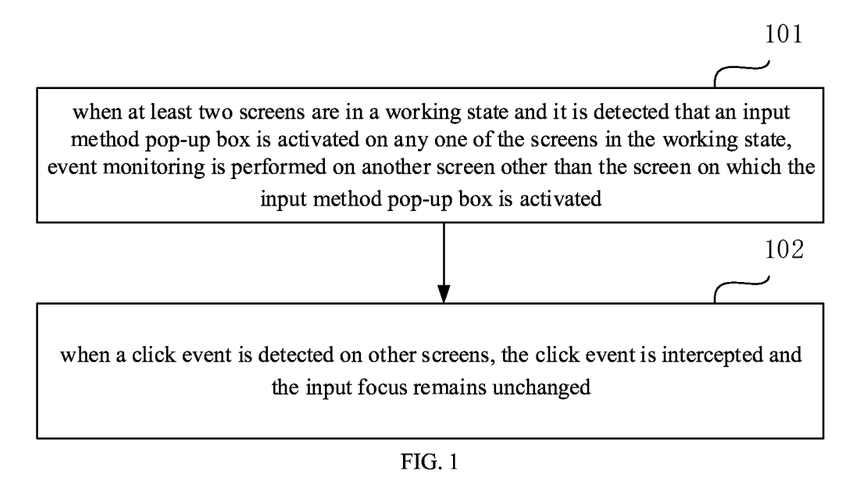
FIG. 1 is a schematic flow chart of an accidental touch prevention method according to some embodiments of the disclosure.

In the following, the prevention of the accidental touch is described in detail through specific embodiments. FIG. 1 is a schematic flow chart showing an accidental touch prevention method, including the following steps.

Step 101: when at least two screens are in a working state and it is detected that an input method pop-up box is activated on any one of the screens in the working state, event monitoring is performed another screen other than the screen on which the input method pop-up box is activated.

When the input method pop-up box is activated, the screen is determined to be in an editing state.

The screen is in the working state refers to that the screen is in a display state. In an embodiment, the intelligent terminal may have multiple screens.

If the intelligent terminal has two screens, i.e., front and back screens, and if the input method pop-up box is activated on the front screen, the event monitoring is performed on the back screen; if the input method pop-up box is activated on the back screen, the event monitoring is performed on the front screen.

Figure 2:
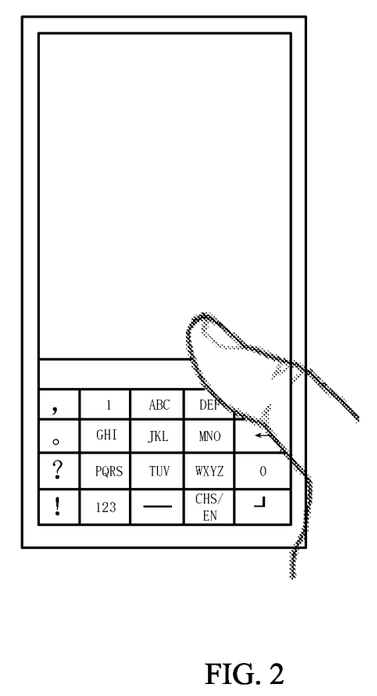
FIG. 2 is a schematic diagram of starting an input method pop-up box according to some embodiments of the present disclosure.

When the screen of the intelligent terminal in the working state is in a folded state, the user is more likely to accidentally touch the screen during use, which causes the input focus to change. Thus, in the embodiment of the present disclosure, when the at least two screens in the working state are in the folded state, if it is detected that the input method pop-up box is activated on any one of the screens in the working state, the event monitoring is performed on another screen other than the screen on which the input method pop-up box is activated. As shown in FIG. 2, the intelligent terminal shown in the figure has two screens. The input method pop-up box is activated on the front screen, and the event monitoring is performed on the back screen (not shown in the figure).

In an embodiment, when the screen of the intelligent terminal in the working state is in an expanded state, the same applies to the present disclosure.

It should be noted that, although the foldable screen in the present disclosure appears to be a splicing of multiple screens, the foldable screen is still one screen in the system, but each screen has a different task window.

Step 102: when a click event is detected on the other screen, the click event is intercepted and the input focus remains unchanged.

Figure 3:
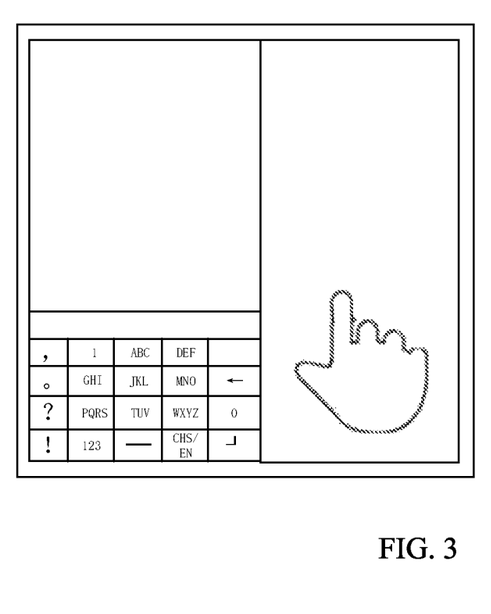
FIG. 3 is a schematic diagram of clicking according to some embodiments of the disclosure.

As shown in FIG. 3, when the left screen is in the editing state (the input method pop-up box appears), and a click event is detected on the right screen, the click event is intercepted, and the input focus is not changed at the same time.

In this way, when the user edits the content on one of the screens, if the other screen is accidentally touched, the input focus is not changed, thereby ensuring the normal editing of the user and improving the user experience.

In some embodiments of the present disclosure, operation events are summarized as two types: click event and sliding event. If an event, such as pressing down or popping up, is detected, the current event is determined to be a click event. If a moving event is detected, the current event is determined as the sliding event. In some embodiments, when performing the event monitoring on a screen that is not in the editing state, in addition to detecting a click event, a sliding event is also detected. When a sliding operation is detected, the sliding operation is performed on the screen on which the editing is performed, which is specifically implemented as follows: if a sliding event is detected on the other screen, a corresponding operation is performed according to the sliding event on a screen on which the input method pop-up box is activated. For example: if a sliding event is detected on the back screen of the intelligent terminal, the sliding operation is performed on the front screen of the intelligent terminal.

In such a manner, if the user desires to view the previous content on the screen in the editing state, it can be implemented by sliding on the other screen, so that there is no operations as complicated as the related art that if a sliding operation needs to be performed on the screen in the editing state, the screen in the editing state firstly needs to be in the normal state, and then the sliding operation is performed on the current screen. Accordingly, the user operation is simplified and the user experience is improved.

In some embodiments of the present disclosure, in order to further improve the user experience, while performing the sliding operation, the editing state is also maintained, which is specifically implemented as controlling the input method pop-up box to keep displayed.

In such a manner, even if the sliding operation is performed on the screen in the editing state, the screen in the editing state still remains in the editing state. In this way, the user can edit at any time without re-entering the editing state, thereby further improving the user experience.

In some embodiments of the present disclosure, in order to prevent the user from accidental sliding operation during use, the position of the sliding event is detected, which is specifically implemented as step A1 to step A2.

Step A1: if a sliding event is detected on the other screen, a position of the sliding event is determined.

Step A2: if the position of the sliding event is in a specified range, a corresponding operation is performed according to the sliding event on the screen on which the input method pop-up box is activated.

Figure 4:
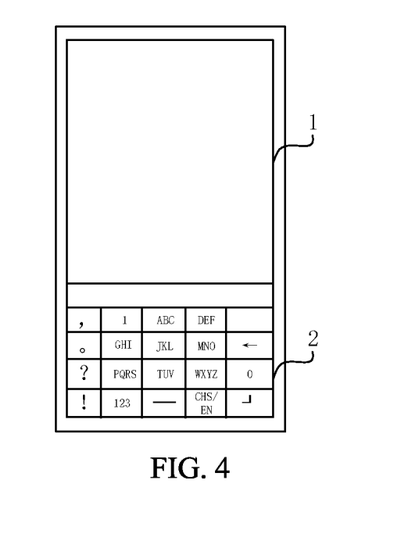
FIG. 4 is a schematic diagram of a specified range according to some embodiments of the disclosure.

In some embodiments, the specified range is an area on the screen except for the input method pop-up box, as shown in FIG. 4, 1 refers to the specified range. It should be noted that the input method pop-up box in FIG. 4 is only utilized to determine the specified range, and the output method pop-up box does not appear on the other screen.

Of course, in some embodiments, the specified range is also determined according to actual conditions. For example, the top of the screen of the intelligent terminal is taken as reference, a downward specified length is a height of the specified range, and a width of the current screen is a width of the specified range.

In some embodiments of the present disclosure, if the position of the sliding event is detected not in the specified range, then the sliding event is intercepted, which is specifically implemented as follows: if the position of the sliding event is not in the specified range, the sliding event is intercepted and the input focus remains unchanged.

In such a manner, only when the sliding event is detected in the specified range, the corresponding sliding operation can be performed, which can prevent the user from making an accidental sliding operation during the use, thereby improving the user experience.

Figure 5:
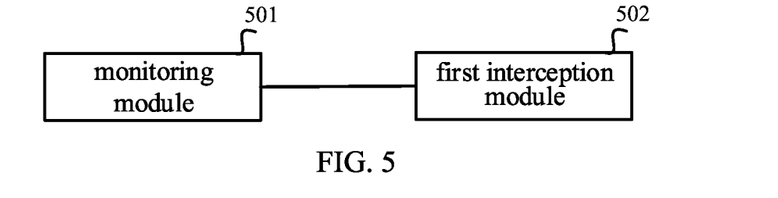
FIG. 5 is a schematic diagram illustrating a text analysis structure according to some embodiments of the disclosure.

Based on the same concept of the present disclosure, embodiments of the present disclosure also provide an accidental touch prevention apparatus. As shown in FIG. 5, the apparatus includes:

a monitoring module 501, which is configured to, when at least two screens are in a working state, and if it is detected that an input method pop-up box is activated on any one of the screens in the working state, perform event monitoring on another screen other than the screen on which the input method pop-up box is activated;

a first interception module 502, which is configured to intercept a click event if the click event is detected on the other screen and remain the input focus unchanged.

In some embodiments, the apparatus further includes:

a performing module, which is configured to perform, after the monitoring module 501 performs the event monitoring on another screen except the screen on which the input method pop-up box is activated when at least two screens are in the working state and it is detected that the input method pop-up box is activated on any one of the screens in the working state, a corresponding operation according to a sliding event on a screen on which the input method pop-up box is activated if the sliding event is detected on the other screen.

In some embodiments, the apparatus further includes:

a control module, which is configured to control the input method pop-up box to keep displayed.

In some embodiments, the performing module includes:

a position determination unit, configured to determine the position of the sliding event if the sliding event is detected on the other screen;

a performing operation unit, configured to, if the position of the sliding event is in a specified range, perform a corresponding operation according to the sliding event on the screen on which the input method pop-up box is activated.

In some embodiments, the apparatus further includes:

a second interception module, configured to intercept the sliding event if the position of the sliding event is not in the specified range, and remain the input focus unchanged.

In some embodiments, the at least two screens in the working state are in the folded state.

After introducing the accidental touch prevention method and apparatus in the exemplary embodiments of the present disclosure, a computing device is provided according to another exemplary embodiment of the present disclosure as follows.

Those skilled in the art can understand that various aspects of the present disclosure can be implemented as a system, a method, or a program product. Therefore, various aspects of the present disclosure can be specifically implemented in the following forms, namely: complete hardware implementation, complete software implementation (including firmware, microcode, etc.), or a combination of hardware and software implementations, which may be collectively referred to herein as "circuit", "module" or "system".

In some possible implementation manners, according to the embodiments of the present disclosure, the computing device may at least include at least one processor and at least one memory. The memory stores program codes, and when the program codes are executed by the processor, the processor is caused to execute the steps 101 to 102 in the accidental touch prevention method according to various exemplary embodiments of the present disclosure described above in this specification.

Figure 6:
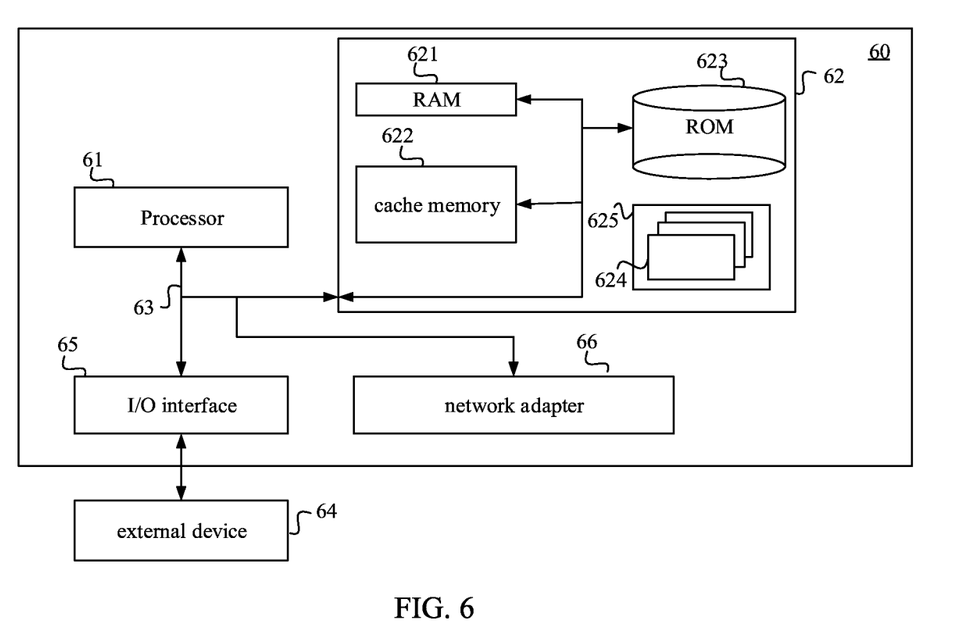
FIG. 6 is a schematic structure diagram illustrating a computing device according to some embodiments of the present disclosure.

The computing device 60 according to the embodiment of the present disclosure will be described below with reference to FIG. 6. The computing device 60 shown in FIG. 6 is only an example, and should not bring any limitation to the function and scope of use of the embodiments of the present disclosure. The computing device may be, for example, a mobile phone, a tablet computer, or the like.

As shown in FIG. 6, the computing device 60 is represented in the form of a general computing device. The components of the computing device 60 may include, but are not limited to: the aforementioned at least one processor 61, the aforementioned at least one memory 62, and a bus 63 connecting different system components (including the memory 62 and the processor 61).

The bus 63 represents one or more of several types of bus structures, including a memory bus or a memory controller, a peripheral bus, a processor, or a local bus using any bus structure among multiple bus structures.

The memory 62 may include a readable medium in the form of a transitory memory, such as a random access memory (RAM) 621 and/or a cache memory 622, and may further include a read-only memory (ROM) 623.

The memory 62 may further include a program/utility tool 625 having a group of (at least one) program modules 624. Such program module 624 includes, but is not limited to: an operating system, one or more application programs, other program modules, and program data. Each or some combination of these embodiments may include the implementation of a network environment.

The computing device 60 may also communicate with one or more external devices 64 (for example, pointing devices, etc.), and may also communicate with one or more devices that enable a user to interact with the computing device 60, and/or communicate with any device (such as a router, a modem, etc.) that enables the computing device 60 to communicate with one or more other computing devices. Such communication can be performed through an input/output (I/O) interface 65. In addition, the computing device 60 may also communicate with one or more networks (for example, a local area network (LAN), a wide area network (WAN), and/or a public network, such as the Internet) through a network adapter 66. As shown in the figure, the network adapter 66 communicates with other modules for the computing device 60 through the bus 63. It should be understood that although not shown in the figure, other hardware and/or software modules can be used in conjunction with the computing device 60, including but not limited to: microcode, a device driver, a redundant processor, an external disk drive array, a RAID system, a tape driver and a data backup storage system, etc.

In some possible embodiments, the various aspects of the accidental touch prevention method provided by the present disclosure can also be implemented in the form of a program product, which includes program code. When the program product operates on a computer device, the program code is configured to make the computer device perform the steps in the accidental touch prevention method according to various exemplary embodiments of the present disclosure described above, and perform the step 101 to step 102 as shown in FIG. 1.

The program product can adopt any combination of one or more readable media. The readable medium may be a readable signal medium or a readable storage medium. The readable storage medium may be, for example, but not limited to, an electrical, magnetic, optical, electromagnetic, infrared, or semiconductor system, equipment, or device, or a combination of any of the above. More specific examples (non-exhaustive list) of readable storage media include: electrical connections with one or more wires, a portable disk, a hard disk, a random access memory (RAM), a read-only memory (ROM), an erasable type programmable read only memory (EPROM or flash memory), an optical fiber, a portable compact disk read only memory (CD-ROM), an optical storage device, a magnetic storage device, or any suitable combination of the above.

The accidental touch prevention method in the embodiment of the present disclosure can be implemented by using a portable compact disk read-only memory (CD-ROM) including program codes and operating on a computing device. However, the program product of the present disclosure is not limited thereto. In this document, the readable storage medium can be any tangible medium that contains or stores a program, and the program can be used by or in combination with an instruction execution system, equipment, or device.

The readable signal medium may include a data signal propagated in a baseband or as a part of a carrier wave, and readable program code is carried therein. Such propagated data signal may have many forms, including, but not limited to, an electromagnetic signal, an optical signal, or any suitable combination of the above. The readable signal medium may also be any readable medium other than the readable storage medium, and the readable medium may send, propagate, or transmit a program used by or in combination with an instruction execution system, apparatus, or device.

The program code contained on the readable medium can be transmitted by any suitable medium, including, but not limited to, wireless, wired, optical cable, RF, etc., or any suitable combination of the above.

The program code used to perform the operations in the present disclosure can be written by one programming language or by any combination of more programming languages. The programming languages include object-oriented programming languages, such as Java, C++, etc., as well as conventional procedural programming language, such as "C" language or similar programming language. The program code can be fully executed on the user computing device, or partly executed on the user device, or executed as an independent software package, or partly executed on the user computing device and partly executed on a remote computing device, or fully executed on the remote computing device or the server. In the case of a remote computing device, the remote computing device can be connected to the user computing device through any kind of network, including a local area network (LAN) or a wide area network (WAN), or can be connected to an external computing device (for example, using an Internet service provider to connect via the Internet).

It should be noted that although several units or subunits of the device are mentioned in the above detailed description, such division is only exemplary and not mandatory. In fact, according to the embodiments of the present disclosure, the features and functions of two or more units described above may be embodied in one unit. Conversely, the feature and function of one unit described above can be further divided into multiple units to embody.

In addition, although the operations of the method of the present disclosure are described in an order in the drawings, this does not require or imply that these operations must be performed in this order, or that all the operations shown must be performed to achieve the desired result. Additionally or alternatively, some steps may be omitted, multiple steps may be combined into one step for execution, and/or one step may be decomposed into multiple steps for execution.

Those skilled in the art should understand that the embodiments of the present disclosure can be provided as a method, a system, or a computer program product. Therefore, the present disclosure may adopt the form of a complete hardware embodiment, a complete software embodiment, or an embodiment combining software and hardware. Moreover, the present disclosure may have the form of a computer program product implemented on one or more computer-usable storage media (including but not limited to a disk storage, a CD-ROM, an optical storage, etc.) containing computer-usable program codes.

The present disclosure is described with reference to flow charts and/or block diagrams of the method, device (system), and computer program product according to embodiments of the present disclosure. It should be understood that each process in the flow chart and/or block in the block diagram, and a combination of processes in the flow chart and/or blocks in the block diagram can be implemented by computer program instructions. These computer program instructions can be provided to the processor of a general-purpose computer, a special-purpose computer, an embedded processor, or other programmable data processing equipment to generate a machine, so that the instructions executed by the processor of the computer or other programmable data processing equipment are configured to produce a device that implements the functions specified in one process or multiple processes in the flow chart and/or one block or multiple blocks in the block diagram.

These computer program instructions can also be stored in a computer-readable memory that can guide a computer or other programmable data processing equipment to work, so that the instructions stored in the computer-readable memory produce an article of manufacture including the instruction device which implements the function specified in one process or multiple processes in the flow chart and/or one block or multiple blocks in the block diagram.

These computer program instructions can also be loaded on a computer or other programmable data processing device, so that a series of operation steps are performed on the computer or other programmable device to produce computer-implemented processing, according to the instructions executed on the computer or other programmable device provide steps for implementing the functions specified in one process or multiple processes in the flow chart and/or one block or multiple blocks in the block diagram.

Although some embodiments of the present disclosure have been described, those skilled in the art can make additional variations and modifications to these embodiments once they learn the basic creative concept. Therefore, the appended claims are intended to be interpreted as including the some embodiments and all variations and modifications falling within the scope of the present disclosure.

Obviously, those skilled in the art can make various modifications and transformations to the present disclosure without departing from the spirit and scope of the present disclosure. In this way, if these modifications and transformations of the present disclosure fall within the scope of the claims of the present disclosure and their equivalent technologies, the present disclosure is also intended to include these modifications and transformations.

What is claimed is:

1. A accidental touch prevention method, applied to an intelligent terminal with a foldable screen, and the method comprising:
   when at least two screens are in a working state and detecting that an input method pop-up box is activated on any one of the screens in the working state, performing event monitoring on another screen other than the screen on which the input method pop-up box is activated;
   when a click event is detected on the other screen, intercepting the click event and remaining an input focus unchanged.

2. The method according to claim 1, wherein, when the at least two screens are in the working state and detecting that the input method pop-up box is activated on any one of the screens in the working state, the method further comprises:
   after performing the event monitoring on another screen other than the screen on which the input method pop-up box is activated,
   when a sliding event is detected on the other screen, performing a corresponding operation according to the sliding event on the screen on which the input method pop-up box is activated.

3. The method according to claim 2, further comprising:
   controlling the input method pop-up box to remain displayed.

4. The method according to claim 2, wherein, when the sliding event is detected on the other screen, performing a corresponding operation according to the sliding event on the screen on which the input method pop-up box is activated comprises:
   when the sliding event is detected on the other screen, determining a position of the sliding event;
   when the position of the sliding event is in a specified range, performing the corresponding operation according to the sliding event on the screen on which the input method pop-up box is activated.

5. The method according to claim 4, further comprising:
   when the position of the sliding event is not in the specified range, intercepting the sliding event and remaining the input focus unchanged.

6. The method according to claim 4, wherein the specified range is based on a top of the screen of the intelligent terminal as a reference, a downward specified length is a height of the specified range, and a width of a current screen is a width of the specified range.

7. The method according to claim 1, wherein the at least two screens in the working state are in a folded state.

8. A non-transitory computer readable medium for a terminal device, storing executable instructions for the terminal device, wherein the executable instructions for the terminal device are configured to perform the method according to claim 1.

9. A computing device, comprising:
   at least one processor, and a memory communicated with the at least one processor; wherein the memory stores instructions executable by the at least one processor, and the instructions are executed by the at least one processor to enable the at least one processor to perform the method according to claim 1.

10. An accidental touch prevention apparatus, comprising:
    a monitoring module, configured to, when at least two screens are in a working state and detecting that an input method pop-up box is activated on any one of the screens in the working state, perform event monitoring on another screen other than the screen on which the input method pop-up box is activated;
    a first interception module, configured to intercept a click event and remain an input focus unchanged when the click event is detected on the other screen.

11. The apparatus according to claim 10, further comprising:
    a performing module, configured to perform, after the monitoring module performs the event monitoring on another screen except the screen on which the input method pop-up box is activated when at least two screens are in the working state and detecting that the input method pop-up box is activated on any one of the screens in the working state, a corresponding operation according to a sliding event on a screen on which the input method pop-up box is activated when the sliding event is detected on the other screen.

* * * * *